United States Patent
Narayanasamy et al.

(10) Patent No.: US 10,635,648 B2
(45) Date of Patent: Apr. 28, 2020

(54) ENTITY IDENTIFIER GENERATION IN DISTRIBUTED COMPUTING SYSTEMS

(71) Applicant: Nutanix, Inc., San Jose, CA (US)

(72) Inventors: Prakash Narayanasamy, Santa Clara, CA (US); Ranjan Parthasarathy, Milpitas, CA (US)

(73) Assignee: Nutanix, Inc., San Jose, CA (US)

( * ) Notice: Subject to any disclaimer, the term of this patent is extended or adjusted under 35 U.S.C. 154(b) by 533 days.

(21) Appl. No.: 15/365,833

(22) Filed: Nov. 30, 2016

(65) Prior Publication Data

US 2020/0034462 A1   Jan. 30, 2020

(51) Int. Cl.
*G06F 16/20* (2019.01)
*G06F 16/22* (2019.01)
*G06F 16/21* (2019.01)
*G06F 16/23* (2019.01)

(52) U.S. Cl.
CPC ........ *G06F 16/2228* (2019.01); *G06F 16/214* (2019.01); *G06F 16/2365* (2019.01)

(58) Field of Classification Search
None
See application file for complete search history.

(56) References Cited

U.S. PATENT DOCUMENTS

| | | |
|---|---|---|
| 5,469,562 A | 11/1995 | Saether |
| 5,625,817 A | 4/1997 | Wood |
| 5,778,201 A | 7/1998 | Scalise |
| 7,584,226 B2 | 9/2009 | Fatula, Jr. |
| 7,586,953 B2 | 9/2009 | Forest |
| 7,693,811 B2* | 4/2010 | Adlung ............... G06F 9/45558 707/999.001 |
| 8,549,518 B1 | 10/2013 | Aron et al. |
| 8,601,473 B1 | 12/2013 | Aron et al. |
| 8,850,130 B1 | 9/2014 | Aron et al. |
| 8,997,097 B1 | 3/2015 | Aron et al. |
| 9,052,936 B1 | 6/2015 | Aron et al. |

(Continued)

OTHER PUBLICATIONS

Wikipedia. "Idempotence". Jul. 14, 2016. 6 pages.

(Continued)

*Primary Examiner* — Belix M Ortiz Ditren
(74) *Attorney, Agent, or Firm* — Vista IP Law Group LLP

(57) ABSTRACT

A method embodiment serves to manage entity names for virtualized entities in a computing system comprising two or more computing nodes that host virtual machines and other virtual entities. The method commences upon receiving a request for identifiers. The request includes an identifier key that is used by a name generator. The name generator implements a deterministic algorithm that will always return the same outputs given the same inputs. The name generator generates a user- or program-specified number of virtualized entity identifiers based on the identifier key. The generated virtualized entity identifiers and corresponding identifier keys are stored in an identifier mapping table that is accessible by the two or more computing nodes. The identifier mapping table describes relationships between the virtualized entity identifiers and corresponding identifier keys. The virtualized entity identifiers are used to create respective virtualized entities. The identifier mapping table can be shared between multiple computing clusters.

20 Claims, 11 Drawing Sheets

(56) References Cited

U.S. PATENT DOCUMENTS

| | | | |
|---|---|---|---|
| 9,218,586 B2* | 12/2015 | Ozkan | G06Q 10/087 |
| 9,256,374 B1 | 2/2016 | Aron et al. | |
| 9,256,475 B1 | 2/2016 | Aron et al. | |
| 9,354,912 B1 | 5/2016 | Aron et al. | |
| 9,389,887 B1 | 7/2016 | Aron et al. | |
| 9,575,784 B1 | 2/2017 | Aron et al. | |
| 9,613,119 B1 | 4/2017 | Aron et al. | |
| 9,619,257 B1 | 4/2017 | Aron et al. | |
| 9,772,866 B1 | 9/2017 | Aron et al. | |
| 10,019,321 B1 | 7/2018 | Aron et al. | |
| 10,055,241 B1* | 8/2018 | DeSanti | G06F 9/45558 |
| 2004/0003111 A1 | 1/2004 | Maeda | |
| 2005/0034033 A1 | 2/2005 | Nemawarkar | |
| 2005/0114386 A1 | 5/2005 | Nassor | |
| 2007/0038687 A1 | 2/2007 | Carroll | |
| 2008/0021972 A1 | 1/2008 | Huelskamp | |
| 2009/0059842 A1 | 3/2009 | Maltseff | |
| 2012/0017096 A1 | 1/2012 | Snider | |
| 2012/0036161 A1 | 2/2012 | Lacapra | |
| 2012/0054234 A1* | 3/2012 | Plantenberg | G06F 21/6236 707/769 |
| 2012/0078855 A1 | 3/2012 | Beatty | |
| 2012/0143887 A1 | 6/2012 | Fontenot | |
| 2012/0259912 A1 | 10/2012 | Kruse | |
| 2013/0185258 A1 | 7/2013 | Bestler | |
| 2013/0217332 A1 | 8/2013 | Altman | |
| 2013/0217333 A1 | 8/2013 | Sprigg | |
| 2013/0297422 A1 | 11/2013 | Hunter | |
| 2013/0339567 A1 | 12/2013 | Carpentier | |
| 2014/0133656 A1 | 5/2014 | Wurster | |
| 2014/0136838 A1* | 5/2014 | Mossbarger | H04L 9/006 713/156 |
| 2014/0304472 A1* | 10/2014 | Colgrove | G06F 3/0608 711/118 |
| 2015/0052287 A1* | 2/2015 | Venkatasubramanian | G06F 9/5033 711/6 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; frst publication date unknown).

Poitras, Steven. "The Nutanix Bible" (Jun. 20, 2014), from http://stevenpoitras.com/the-nutanix-bible/ (Publication date based on indicated capture date by Archive.org; frst publication date unknown).

Poitras, Steven. "The Nutanix Bible" (Jan. 7, 2015), from http://stevenpoitras.com/the-nutanix-bible/ (Publication date based on indicated capture date by Archive.org; frst publication date unknown).

Poitras, Steven. "The Nutanix Bible" (Jun. 9, 2015), from http://stevenpoitras.com/the-nutanix-bible/ (Publication date based on indicated capture date by Archive.org; frst publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Saucez et al., "On the Dynamics of Locators in LISP", 2012, International Federation for Information Processing.

RFC—A Universally Unique Identifier (UUID) URN Namespace, 2005, Network Working Group. Retrieved from the Internet Jul. 25, 2017 at https://tools.ietf.org/html/rfc4122.

Akkar et al., "An Implementation of DES and AES Secure against Some Attacks", 2001, Springer-Verlag.

Cano, I. et al., "Curator: Self-Managing Storage for Enterprise Clusters", 14th USENIX Symposium on Networked Systems Design and Implementation, NSDI '17, (Mar. 27, 2017).

\* cited by examiner

ENTITY IDENTIFIER GENERATION IN DISTRIBUTED COMPUTING SYSTEMS

BACKGROUND

Modern computing systems comprise components that are combined to achieve efficient scaling of distributed computing resources, distributed data storage resources, distributed networking resources, and/or other resources. Such distributed systems have evolved in such a way that incremental linear scaling can be accomplished in many dimensions. The resources in a given distributed system are often grouped into resource subsystems, such as clusters, datacenters, or sites. The resource subsystems can be defined by physical and/or logical boundaries. For example, a cluster might comprise a logically bounded set of nodes associated with a certain department of an enterprise, while a datacenter might be associated with a particular physical geographical location. Modern clusters in a distributed system might support over one hundred nodes (or more) that in turn support as many as several thousands (or more) autonomous virtualized entities (VEs). The VEs in hyperconverged distributed systems might be virtual machines (VMs) and/or executable containers, in hypervisor-assisted virtualization environments and/or in operating system virtualization environments, respectively. System administrators or other users (e.g., code developers) of the VEs rely on VE identifiers (VEIDs) to refer to a given VE for various purposes. For example, a system administrator might use VEIDs to monitor performance and/or activity pertaining to a particular one of, or set of VEs in the system. As another example, a code developer might use a VEID as a literal name in a script or application (e.g., to invoke or otherwise address a particular VE).

Unfortunately, legacy techniques for managing virtualized entity identifiers based on user-generated VEIDs can conflict with other user-generated VEIDs. Specifically, certain legacy approaches allow any number of users (e.g., system administrators, application developers, script developers, etc.) to manually specify the VEID. For example, a first system administrator might specify his/her VEID (e.g., "MyVEID1") when the VE is created, while a second system administrator might specify his/her VEID (e.g., "MyVEID1") for some purpose. With such manual approaches, duplicate VEIDs within a cluster or across clusters can be present. Conflicts can occur at random moments in time (e.g., whenever an administrator specifies a VEID), and then can be codified into the code base, and then can be propagated throughout the cluster or site. For example, when a script referencing a certain VE identified as "VEID05" from one resource subsystem, such as cluster C01, is deployed to another resource subsystem, such as cluster C02, that already has a different VE that is also identified as "VEID05" (e.g., by another system administrator or developer), a conflict arises. In this case, the script may fail and/or may not perform properly (e.g., it may return incorrect data). Further, the foregoing legacy techniques risk VE identifier conflicts in hyperconverged distributed systems that include centralized access points. Specifically, as an example, a multi-cluster centralized dashboard application might display the performance or other information of VE "VEID05", however that information might include information from two or more VEs that are referenced by the same (conflicted) identifier "VEID05".

What is needed is a technique or techniques to improve over legacy techniques and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for forming and maintaining system generated unique entity identifiers in hyperconverged distributed environments, which techniques advance the relevant technologies to address technological issues with legacy approaches. More specifically, the present disclosure provides a detailed description of techniques used in systems, methods, and in computer program products for forming and maintaining system generated unique entity identifiers in hyperconverged distributed environments. Certain embodiments are directed to technological solutions for generating unique virtualized entity identifiers associated with a user-specified key to facilitate conflict-free entity identification in hyperconverged distributed systems.

The disclosed embodiments modify and improve over legacy approaches. In particular, the herein-disclosed techniques provide technical solutions that address the technical problems that relate to avoiding virtualized entity identifier conflicts in a hyperconverged distributed system.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Embodiments in accordance with the present disclosure address the problem of avoiding virtualized entity identifier conflicts in a distributed computing system. Some embodiments are directed to approaches for generating unique virtualized entity identifiers associated with a user-specified key to facilitate conflict-free entity identification in hyperconverged computing systems. The accompanying figures and discussions herein present example environments, systems, methods, and computer program products for forming and maintaining system generated unique entity identifiers.

Overview

Disclosed herein are techniques for generating unique virtualized entity identifiers associated with an agent-specified (e.g., user- or program-specified) key to facilitate conflict-free entity identification in distributed computing systems.

Figure 1A:
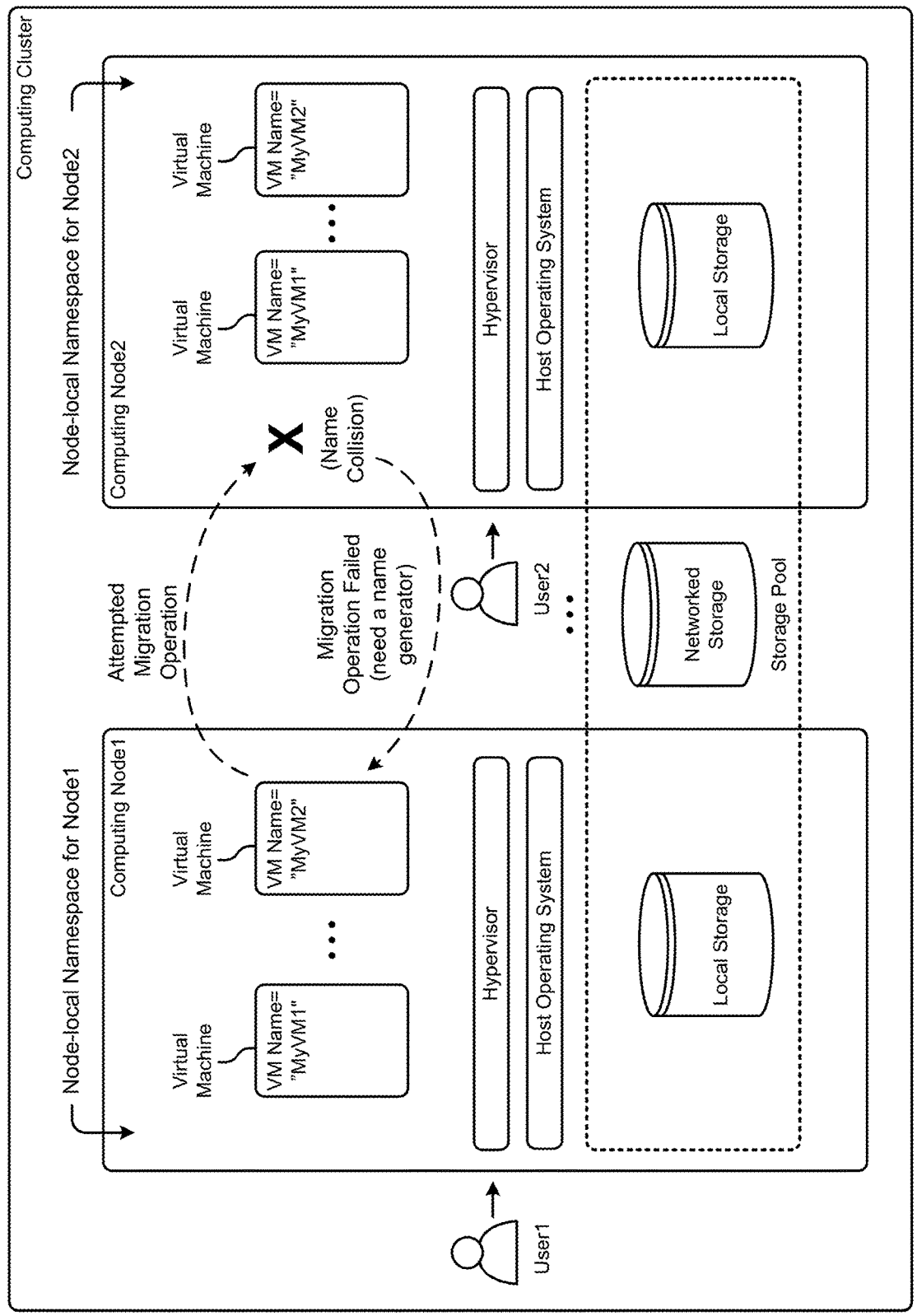
FIG. 1A presents an entity namespace collision scenario in a multi-node computing cluster.

FIG. 1A presents an entity namespace collision scenario in a multi-node computing cluster. In this example, the computing cluster comprises two or more nodes (e.g., shown as computing node1 and computing node2). In this scenario, each node is served by a respective hypervisor, and each node has a respective user (e.g., User1 and User2). For illustrative purposes, User1 creates a virtual machine named "MyVM1" on Node1. In a concurrently-running timeframe, User2 creates a virtual machine named "MyVM1" on Node2. Since the namespaces are different between the two nodes, even though the name "My VM1" is used by both User1 and User2, there is no ambiguity or conflict. However, in a situation when a virtual machine is to be migrated (e.g., in response to a migration command) from one node (e.g., Node1) to another node (e.g., Node2), the migration would fail due to the name "MyVM2" being used twice in the same namespace (e.g., in the namespace of Node2). Although it might be possible to rename the migrated virtual machine to a name that does not collide with identifiers in the namespace of Node2, this renaming requirement would need to be communicated to User1, and User1 would need to revise all references (e.g., scripts, etc.) to User1 's "MyVM2". The same collision would occur if the migration command had been applied to "MyVM1" (e.g., to move "MyVM1" of Node1 to Node2).

A module that generates unique names on behalf of a user for a virtual machine (or any other entity) would prevent names from colliding, even though the virtual machines (or other entities) are migrated to other nodes in the cluster. The function of such a generator (e.g., to respond to user requests for unique entity identifiers), its implementation (e.g., through an API), and its uses are described hereunder.

In one particular embodiment, an API is implemented to facilitate user requests for one or more unique virtualized entity identifiers (VEIDs) using a user-specified identifier key (e.g., character string, etc.). A set of VEIDs are generated using a low collision, highly differentiable UUID generation algorithm. The VEIDs are stored in a VEID mapping table that associates the identifier key with the generated VEIDs. The generated VEIDs are each assigned to a respective unique VE in the system to facilitate conflict-free entity identification. In certain embodiments, a VEID detected in a given command can be validated using the mapping table. In other embodiments, a number of VEIDs desired can be issued in the VEID request. In yet other embodiments, instances of the VEID mapping table from respective resource subsystems (e.g., clusters) can be merged into a centralized VEID mapping repository.

The aforementioned virtualized entities are any representations of an individual one of, or a group of computing system constituents (e.g., a disk drive, or a memory, or a machine, or a VM, or a virtual disk, or a device or a virtualized device, or a process, or a thread, or a data structure, or any other computing system constituent or combination thereof).

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

Figure 1B:
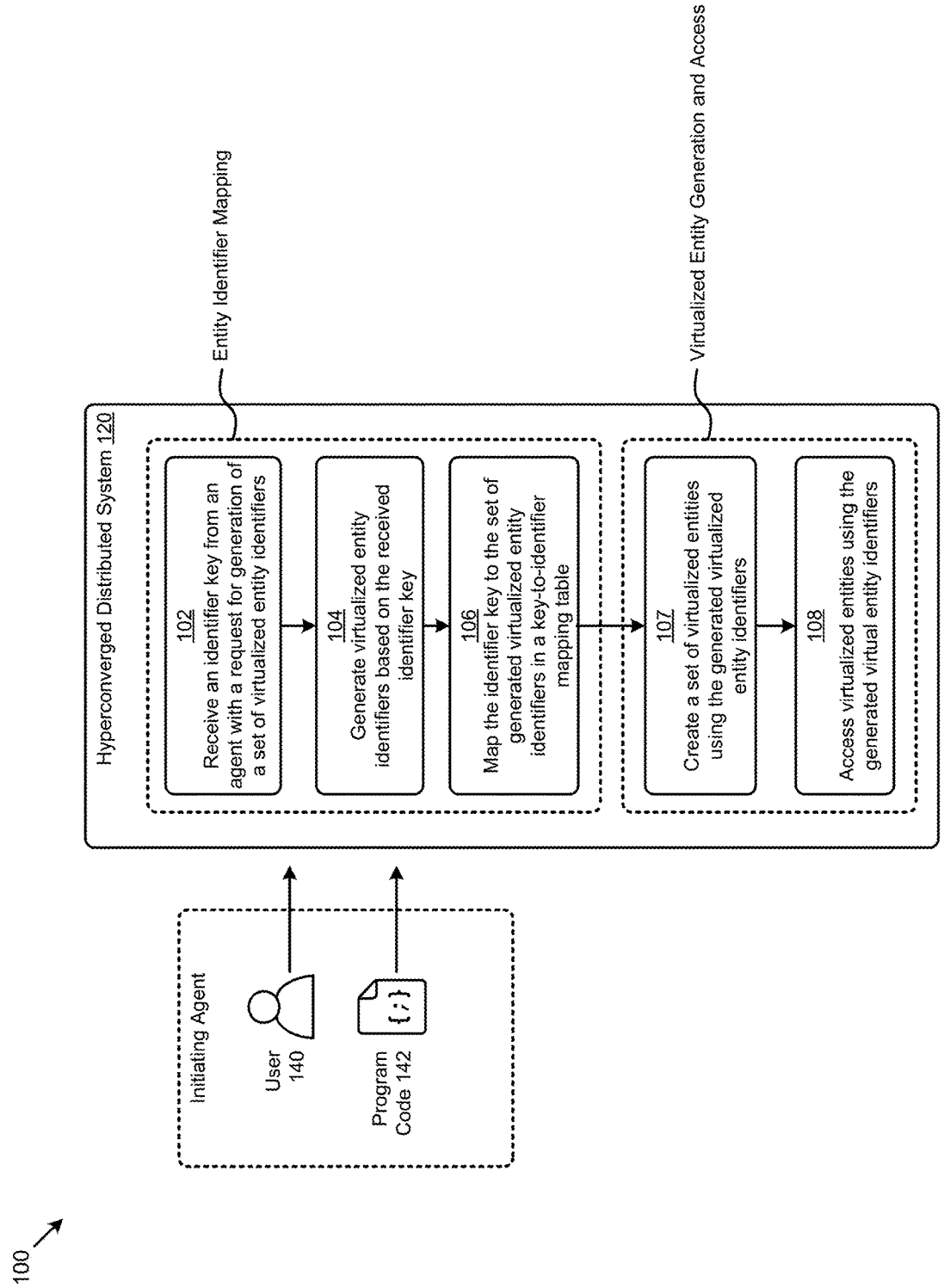
FIG. 1B presents an entity identification generation and usage technique as implemented in a hyperconverged distributed system, according to an embodiment.

FIG. 1B presents an entity identification generation and usage technique 100 as implemented in a hyperconverged distributed system. As an option, one or more variations of entity identification generation and usage technique 100 or any aspect thereof may be implemented in the context of the architecture and functionality of the embodiments described herein. The entity identification generation and usage technique 100 or any aspect thereof may be implemented in any environment.

The entity identification generation and usage technique 100 shown in FIG. 1B presents one embodiment of certain steps facilitated by the herein disclosed techniques for entity identifier generation in distributed computing systems. As shown, such entity identifier generation techniques might be implemented to facilitate certain interactions between a hyperconverged distributed system 120 and a user 140 and/or a set of program code 142. Program code 142 represents a set of programming code instructions that can be executed by one or more resources at the hyperconverged distributed system 120 to perform certain functions. For example, program code 142 might comprise a script, a subroutine, a portion of application code, a command line instruction, and/or another set of programming code instructions. In some cases, and as shown, the system is agnostic to the origin of any entity generation request. Specifically, the hyperconverged distributed system can receive entity generation requests from any initiating agent, which initiating agent might be a user (e.g., through a user interface), or might be program code 142 (e.g., program code that was generated by either a user or by yet another agent).

User 140 may also access the virtualized entities (VEs) in hyperconverged distributed system 120 for various purposes, such as VE management (e.g., creating VEs, deleting VEs, etc.), VE performance monitoring, and/or other purposes. To facilitate accessing the virtualized entities for such purposes virtualized entity identifiers (VEIDs) are often used to address a particular VE. As earlier described, however, some approaches to managing VEIDs in hyperconverged distributed environments can present limitations at least as pertaining to conflicts between the VEIDs.

The entity identification generation and usage technique 100 as implemented using the herein disclosed techniques address such limitations by generating unique virtualized entity identifiers associated with a user-specified identifier key to facilitate conflict-free entity identification in hyperconverged distributed systems. Specifically, entity identification generation and usage technique 100 can commence with receiving an identifier key with a request for one or more virtualized entity identifiers (step 102). The identifier key is a set of information (e.g., character string) specified by user 140 or program code 142 to associate with the requested VEIDs. Responsive to the VEID request, a set of VEIDs are generated (step 104). In this case, the VEIDs are generated at the hyperconverged distributed system 120 as compared to being generated by a user in other approaches. The identifier key and the generated VEIDs are then stored in an identifier mapping table to associate (e.g., map) the identifier key to the generated VEIDs (step 106). When the identifier key and the generated VEIDs have been stored in the identifier mapping table, virtualized entities can be generated and named using the generated VEIDs. Moreover, after such virtualized entities have been generated and named using the generated VEIDs they can be accessed through the identifier mapping table. More specifically, a requestor (e.g., initiating agent, user 140, program code 142, etc.) can use the key-to-identifier mapping and/or the system generated VEIDs to access a respective set of VEs identified by the VEIDs (step 108). For example, the system might assign one of the generated VEIDs (e.g., "s93lqp") to a given VE when it is created. Program code 142 can create (step 107) and address this particular VE using the assigned identifier "s93lqp".

Figure 2:
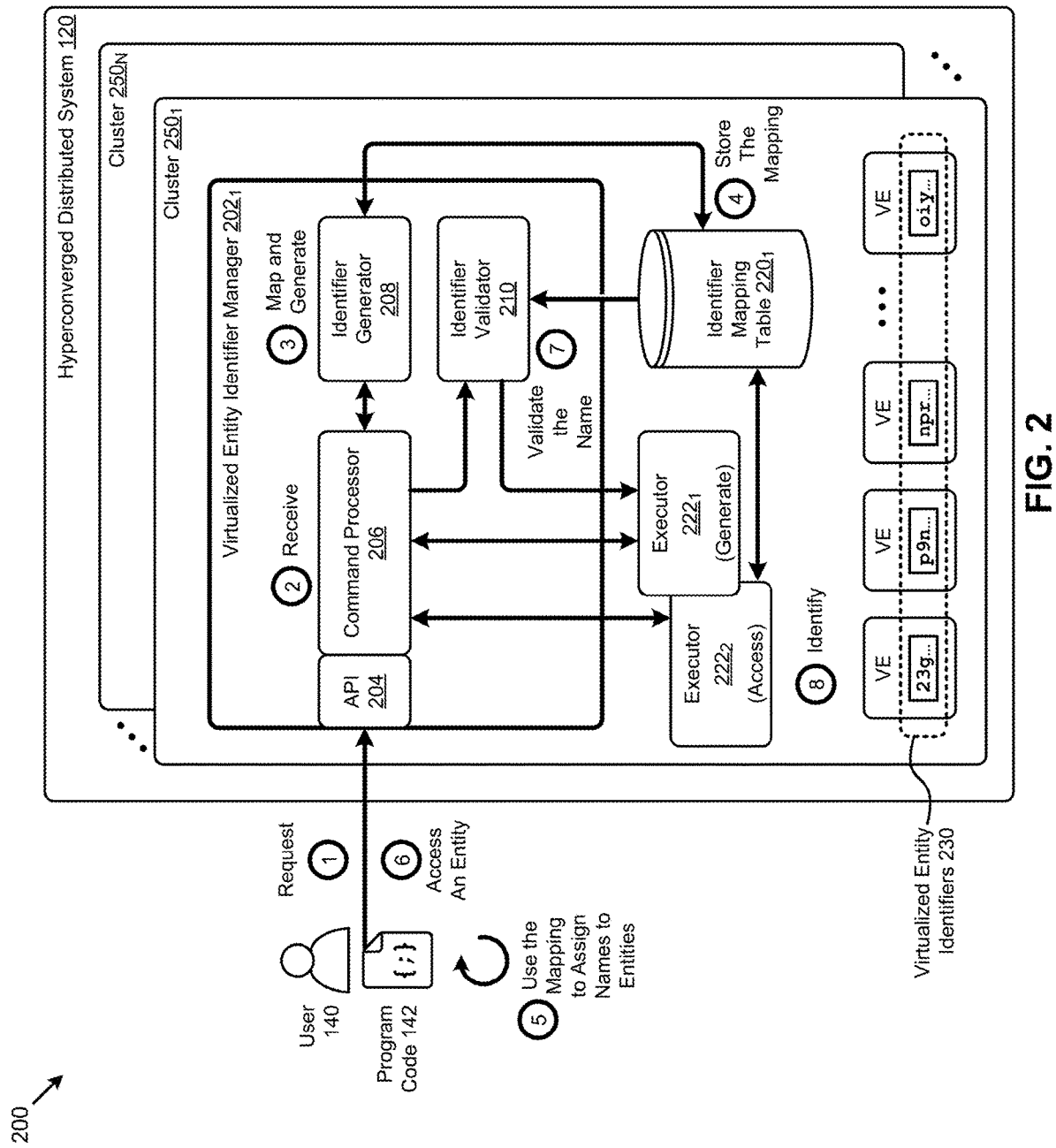
FIG. 2 presents an environment that supports various entity identifier generation and validation techniques that are used in forming and maintaining system generated unique entity identifiers in hyperconverged distributed environments, according to an embodiment.

One embodiment of a subsystem and corresponding data flows for implementing any of the herein disclosed techniques is shown and described as pertaining to FIG. 2.

FIG. 2 presents an environment 200 that supports various entity identifier generation and validation techniques that are used in forming and maintaining system generated unique entity identifiers in hyperconverged distributed environments. As an option, one or more variations of environment 200 or any aspect thereof may be implemented in the context of the architecture and functionality of the embodiments described herein. The environment 200 or any aspect thereof may be implemented in any environment.

The embodiment shown in FIG. 2 is merely one implementation of a virtualized entity identifier manager for forming and maintaining system generated unique entity identifiers in hyperconverged distributed environments according to the herein disclosed techniques. Specifically, instances of the virtualized entity identifier manager can facilitate generating, validating, and/or other operations pertaining to VEIDs in hyperconverged computing environments. As can be observed, an instance of a virtualized entity identifier manager (e.g., virtualized entity identifier manager $202_1$) is implemented in cluster $250_1$ of the hyperconverged distributed system 120. Other instances of the virtualized entity identifier manager might be implemented in other clusters (e.g., cluster $250_N$) in hyperconverged distributed system 120. According to the shown embodiment, virtualized entity identifier manager $202_1$ comprises a command processor 206 with an application programming interface (API) front-end (e.g., API 204), an identifier generator 208, and an identifier validator 210. The virtualized entity identifier manager $202_1$ further interfaces with an identifier mapping table $220_1$ and one or more instances of an executor (e.g., executor $222_1$, executor $222_2$) in cluster $250_1$.

User 140 and/or program code 142, earlier described, can issue a request for one or more VEIDs to virtualized entity identifier manager $202_1$ at API 204 (operation 1). API 204 represents an API specification describing the structure (e.g., syntax, semantics, etc.) of any messages (e.g., calls, requests, commands, etc.) processed by the virtualized entity identifier manager $202_1$. API 204 and command processor 206 process (e.g., parse, interpret, etc.) such messages for further processing at the virtualized entity identifier manager $202_1$. Command processor 206 also issues messages (e.g., responses to user 140 or program code 142) according to API 204. Specifically, the aforementioned VEID request can be received and processed by API 204 and command processor 206 (operation 2). Certain parameters pertaining to the received VEID request are accessed by identifier generator 208 to generate the requested VEIDs (operation 3). For example, identifier generator 208 might implement an algorithm such as the UUID4 algorithm to generate low collision, highly differentiable identifiers. The generated VEIDs are delivered to the requestor in a response message issued by command processor 206. The generated VEIDs are also stored in the identifier mapping table $220_1$ (operation 4). In certain embodiments, the VEIDs are stored with an identifier key received in the VEID request to facilitate management (e.g., lookup, etc.) of the VEID in the identifier mapping table $220_1$.

Each of the generated VEIDs can be assigned to a respective VE in cluster $250_1$ (operation 5). The VEIDs can be assigned at the discretion of the owner (e.g., requestor) to an existing VE or at the creation of a VE. As shown, a truncated set of virtualized entity identifiers 230 are assigned to a respective set of VEs in cluster $250_1$. When VEID assignments are determined, the user 140 and/or the program code 142 can issue commands that include access to the VEs using the VEIDs (operation 6). Such access commands are intercepted at the command processor 206 and routed to identifier validator 210. Identifier validator 210 serves to validate any identifiers included in commands issued to the system (operation 7). The identifier validator 210 can access the identifier mapping table $220_1$ to determine if a given identifier was generated by the system (e.g., at the virtualized entity identifier manager $202_1$). If the identifier in the command is validated (e.g., found in the identifier mapping table $220_1$), the command can be forwarded to executor for execution at the identified VEs (operation 8). If the identifier validator 210 was not generated by the system (e.g., at the virtualized entity identifier manager $202_1$), then remediating actions can be taken (see FIG. 4).

The components and data flows shown in FIG. 2 present merely one partitioning and associated data manipulation approach. The specific example shown is purely exemplary, and other subsystems and/or partitioning are reasonable. Further details related to the aforementioned virtualized entity identifier generation operation implemented in the virtualized entity identifier manager $202_1$ are shown and described as pertaining to FIG. 3.

Figure 3:
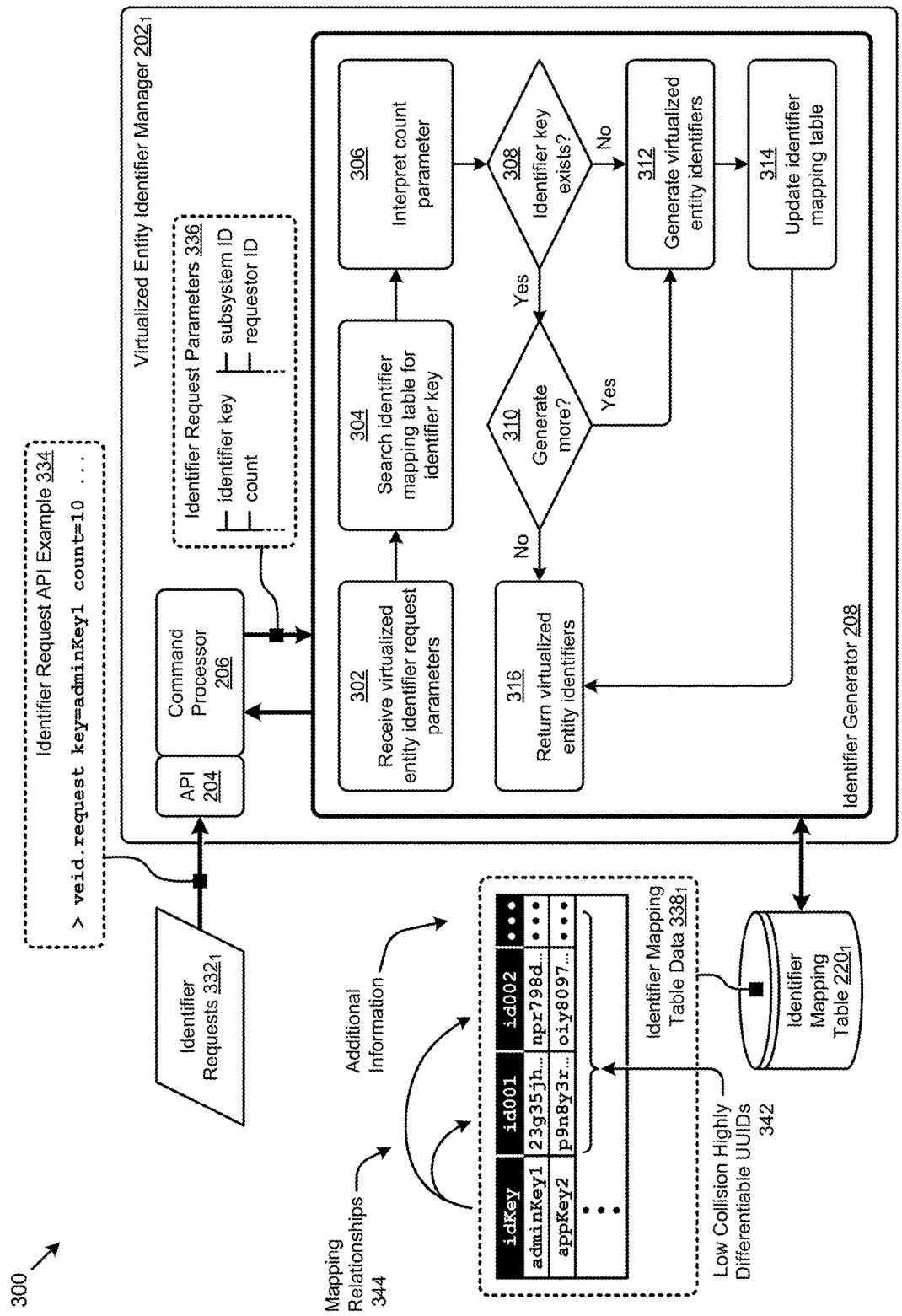
FIG. 3 presents an entity identifier generation technique as implemented in systems for forming and maintaining system generated unique entity identifiers in hyperconverged distributed environments, according to an embodiment.

FIG. 3 presents an entity identifier generation technique 300 as implemented in systems for forming and maintaining system generated unique entity identifiers in hyperconverged distributed environments. As an option, one or more variations of entity identifier generation technique 300 or any aspect thereof may be implemented in the context of the architecture and functionality of the embodiments described herein. The entity identifier generation technique 300 or any aspect thereof may be implemented in any environment.

The identifier generator 208 of the virtualized entity identifier manager $202_1$ earlier described is shown in FIG. 3 interacting with the command processor 206 and the identifier mapping table $220_1$ to facilitate generation of virtualized entity identifiers according to the herein disclosed techniques. In the embodiment shown, the API 204 at the command processor 206 receives instances of identifier requests $332_1$ from one or more users, sets of program code, and/or other sources. The identifier requests are messages issued to the virtualized entity identifier manager $202_1$ to invoke generation of one or more virtualized entity identifiers. As indicated by the presence of API 204, the messages are structured according to an API (e.g., API 204) to facilitate interpretation and processing at virtualized entity identifier manager $202_1$ (e.g., by command processor 206). As an example, an identifier request might be structured as shown in the identifier request API example 334. Specifically, an identifier request can comprise a "request" command from a "veil" object class with an identifier "key" argument (e.g., "adminKey1"), a count argument (e.g., "10"), and/or other arguments. The instances of identifier requests received at API 204 and command processor 206 are processed (e.g., parsed) to extract various parameters from the request to be used by the identifier generator 208. For example, as shown in the representative list of parameters in identifier request parameters 336, the parameters extracted from the identifier requests can include an "identifier key", a "count" of identifiers, a resource subsystem (e.g., cluster, site, datacenter, etc.) identifier or "subsystem ID", a requestor identifier or "requestor ID", and/or other parameters. Some parameters (e.g., arguments) might be optional when issuing an identifier request. The identifier request parameters are often organized, transmitted, and/or stored in key-value pairs, where the key is the parameter type and the value is the set of information associated with that parameter. For example, a parameter associated with an identifier key might have a key of "idKey" and a value of "adminKey1".

The shown embodiment of the steps facilitated by the identifier generator 208 for generating the requested identifiers can commence with receiving the virtualized entity identifier request parameters (step 302). The identifier mapping table $220_1$ is searched to discover whether the identifier key included in the identifier request exists in the then-current data in the mapping table (step 304). A count parameter received by the identifier generator 208 is interpreted (step 306). In certain embodiments, the count is interpreted as an incremental number of VEIDs requested for generation in response to the identifier request. In this case, the number of VEIDs generated incrementally adds to any VEIDs earlier associated with a given identifier key. In other embodiments, the count is interpreted as the total number of VEIDs associated with a given identifier key. In this case, the number of VEIDs generated in response to the identifier request is determined so as to result in a total number of VEIDs associated with the identifier key that equals the count value.

If the identifier key exists in the identifier mapping table $220_1$ (see "Yes" path of decision 308), a decision can be made pertaining to the number, if any, of VEIDs to generate (decision 310). For example, if the count parameter is interpreted as a total number of VEIDs and that total is met or exceeded as indicated by the data records in the identifier mapping table $220_1$, then no further VEIDs are generated (see "No" path of decision 310). In this case, a response to the identifier request can return the virtualized entity identifiers associated with the identifier key in the request (step 316). In some cases, the purpose of an identifier request is to return the VEIDs associated with a given identifier key. The techniques herein disclosed deliver a consistent response to repeated instances of such identifier requests facilitated in part by the data records stored in the identifier mapping table $220_1$. In an API service context, when such consistent responses are produced by multiple instances of a given service call (e.g., identifier request), the service call can be referred to as "idempotent".

Referring again to entity identifier generation technique 300 in FIG. 3, if the count parameter is interpreted as a total number of VEIDs and fewer than that total is discovered in the identifier mapping table $220_1$, or if the count parameter is interpreted as an incremental number of VEIDs requested, an additional number of VEIDs will be generated according to the count interpretation (see "Yes" path of decision 310). Further, if the earlier search for the identifier key in the identifier mapping table $220_1$ discovers the identifier key does not exist in the table, a number of VEIDs will be generated according to the count interpretation (see "No" path of decision 308).

The identifier generator 208 can generate the virtualize entity identifiers using various techniques (step 312). One such technique, for example, implements a "version 4 UUID" algorithm to generate universally unique identifiers (UUID) from random or pseudo-random numbers (e.g., 60-bit timestamp). The resulting UUIDs from such algorithms are low collision, highly differentiable UUIDs. Other UUID generation algorithms are possible. The identifier mapping table $220_1$ is then updated with the generated VEIDs and/or other information (e.g., identifier key, occurrence of an access request, requestor information, etc.) pertaining to the identifier request (step 314). As shown in example of the identifier mapping table data $338_1$, the data in the identifier mapping table $220_1$ are often organized and/or stored in a tabular structure (e.g., relational database table) having rows corresponding to a certain identifier key and columns corresponding to VEIDs associated with that particular identifier key. For example, a row corresponding to an identifier key or "idKey" of "adminKey1" might have a set of VEIDs columns (e.g., "id001", "id002", etc.) storing a string of characters representing the UUID associated with each respective VEID (e.g., "23g35jh . . . ", "npr798d . . . ", etc.). Truncated versions of the low collision highly differentiable UUIDs 342 (e.g., typically 32 or more characters) are shown for illustrative purposes. As further shown, the relational database table structure in identifier mapping table $220_1$ establishes a set of mapping relationships 344 between a given identifier key and its corresponding VEIDs. Any newly generated VEIDs and earlier generated VEIDs can be returned to the requestor in response to the invoking identifier request (step 316).

Figure 4:
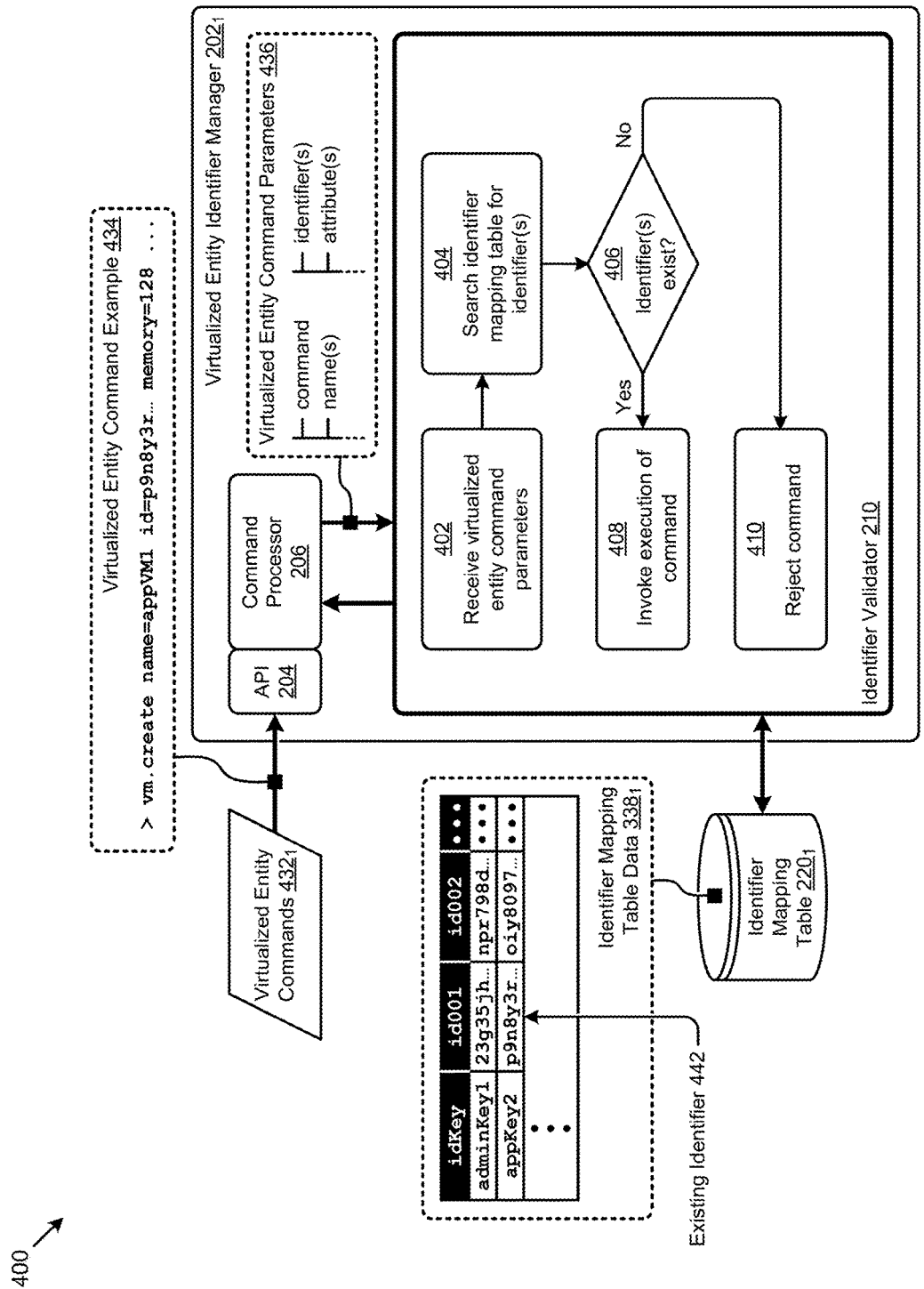
FIG. 4 presents an entity identifier validation technique as implemented in systems for forming and maintaining system generated unique entity identifiers in hyperconverged distributed environments, according to an embodiment.

Further details related to the aforementioned virtualized entity identifier validation operation implemented in the virtualized entity identifier manager $202_1$ are shown and described as pertaining to FIG. 4.

FIG. 4 presents an entity identifier validation technique 400 as implemented in systems for forming and maintaining system generated unique entity identifiers in hyperconverged distributed environments. As an option, one or more variations of entity identifier validation technique 400 or any aspect thereof may be implemented in the context of the architecture and functionality of the embodiments described herein. The entity identifier validation technique 400 or any aspect thereof may be implemented in any environment.

The identifier validator 210 of the virtualized entity identifier manager $202_1$ earlier described is shown in FIG. 4 interacting with the command processor 206 and the identifier mapping table $220_1$ to facilitate validation of virtualized entity identifiers according to the herein disclosed techniques. In the embodiment shown, the API 204 at the command processor 206 receives instances of virtualized entity commands $432_1$ from one or more users, sets of program code, and/or other sources. The virtualized entity commands are messages issued to a hyperconverged distributed system that references one or more virtualized entity (e.g., VM, container, etc.) using an entity identifier. The messages are intercepted by the virtualized entity identifier manager $202_1$ to validate the entity identifier as a VEID generated by the system according to the herein disclosed techniques. As indicated by the presence of API 204, the messages are structured according to an API (e.g., API 204) to facilitate interpretation and processing at virtualized entity identifier manager $202_1$ (e.g., by command processor 206). As an example, a virtualized entity command intercepted by the virtualized entity identifier manager $202_1$ might be structured as shown in the virtualized entity command example 434. Specifically, a virtualized entity command can comprise a "create" command from a "vm" object class with a "name" argument (e.g., "appVM1"), a virtualized entity identifier or "id" argument (e.g., "p9n8y3r . . . "), a "memory" attribute argument (e.g., "128" MB), and/or other arguments. The instances of virtualized entity commands received at API 204 and command processor 206 are processed (e.g., parsed) to extract various parameters from the request to be used by the identifier validator 210. For example, as shown in the representative list of parameters in virtualized entity command parameters 436, the parameters extracted from the virtualized entity commands can include a "command" identifier, one or more "name(s)" for the referenced virtualized entities, one or more respective "identifier(s)" associated with the virtualized entities, one or more "attribute(s)" associated with the command, and/or other parameters. Some parameters (e.g., arguments) might be optional when issuing a virtualized entity command. The virtualized entity command parameters are often organized, transmitted, and/or stored in key-value pairs, where the key is the parameter type and the value is the set of information associated with that parameter. For example, a parameter associated with a virtualized entity name might have a key of "name" and a value of "appVM1".

The shown embodiment of the steps facilitated by the identifier validator 210 for validator the referenced identifiers can commence with receiving the virtualized entity command parameters (step 402). The identifier mapping table $220_1$ is searched to discover whether the identifiers referenced in the command exist in the then-current data in the mapping table (step 404). If any of the VEIDs in the command do not exist in the identifier mapping table $220_1$ (see "No" path of decision 406) the command is rejected (step 410). If the VEIDs referenced in the command exist in the identifier mapping table $220_1$ (see "Yes" path of decision 406) the execution of the command is invoked (step 408). As can be observed, for example, the VEID specified in the virtualized entity command example 434 (e.g., "id= p9n8y3r . . . ") exists in the identifier mapping table data $338_1$ (see existing identifier 442). In some cases, if some identifiers exist and other do not exist, the portion of the command pertaining to the existing identifiers might be executed while the portion of the command pertaining to the identifiers not found in the identifier mapping table is rejected. A warning pertaining to the missing identifiers might be issued in a response to the requestor. Instructions for requesting generation of VEIDs might also be provided.

Generating VEIDs as described in the entity identifier generation technique 300 and validating the VEIDs as described in the entity identifier validation technique 400 facilitate avoidance of virtualized entity identifier conflicts in hyperconverged distributed systems. Such techniques can be implemented in single cluster hyperconverged computing environments or multi-cluster hyperconverged computing environments. An example multi-cluster implementation is shown and described as pertaining to FIG. 5.

Figure 5:
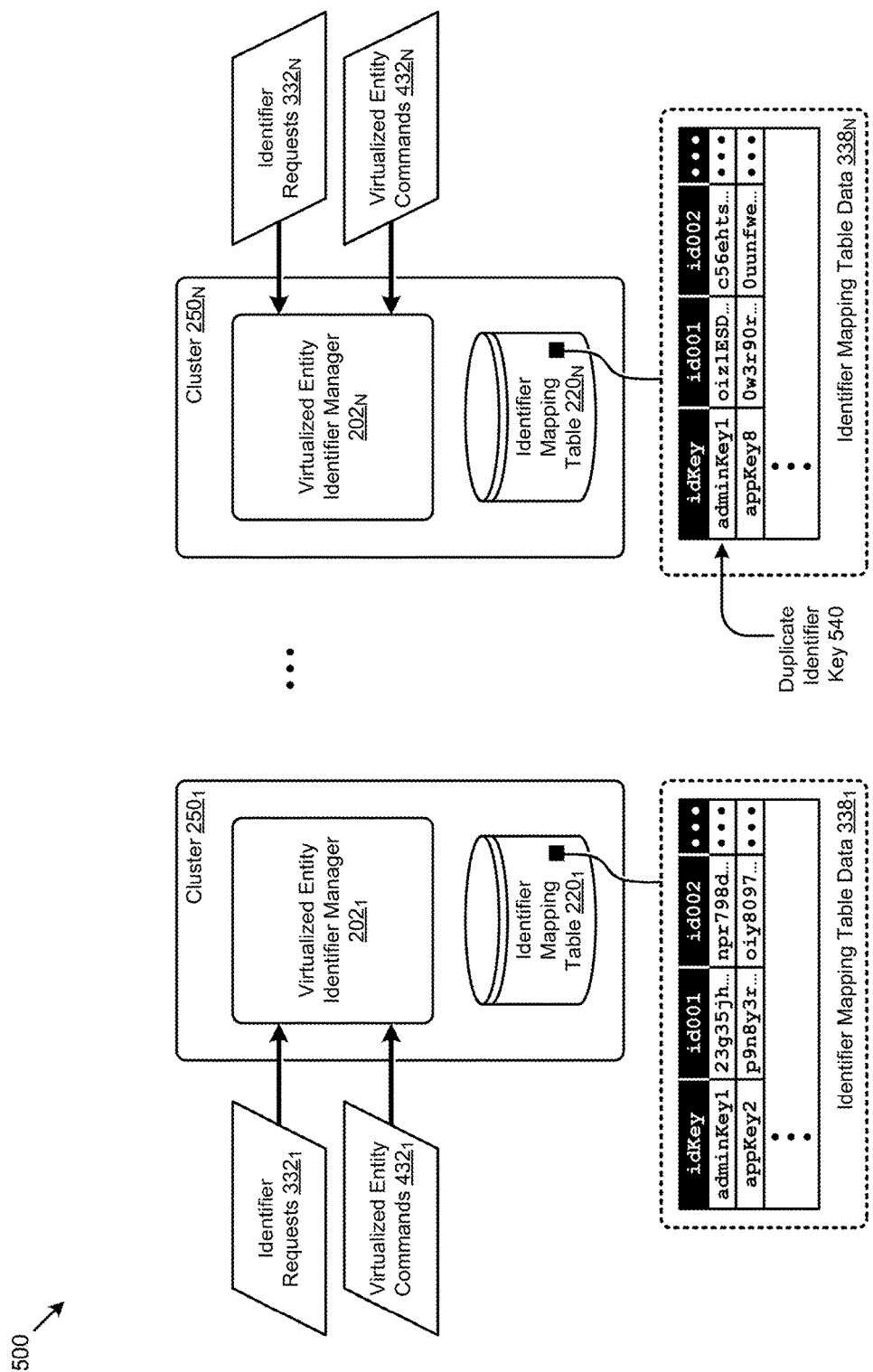
FIG. 5 illustrates a multi-cluster entity identifier generation technique as implemented in systems for forming and maintaining system generated unique entity identifiers in hyperconverged distributed environments, according to an embodiment.

FIG. 5 illustrates a multi-cluster entity identifier generation technique 500 as implemented in systems for forming and maintaining system generated unique entity identifiers in hyperconverged distributed environments. As an option, one or more variations of multi-cluster entity identifier generation technique 500 or any aspect thereof may be implemented in the context of the architecture and functionality of the embodiments described herein. The multi-cluster entity identifier generation technique 500 or any aspect thereof may be implemented in any environment.

The embodiment shown in FIG. 5 is merely one example of the herein disclosed techniques implemented in multiple clusters of a hyperconverged distributed environment. As shown, representative clusters (e.g., cluster $250_1$ and cluster $250_N$) from the multi-cluster environment each comprise an instance of the earlier described virtualized entity identifier manager (e.g., virtualized entity identifier manager $202_1$ and virtualized entity identifier manager $202_N$) and identifier mapping table (e.g., identifier mapping table $220_1$ and identifier mapping table $220_N$). Various instances of identifier requests (e.g., identifier requests $332_1$ and identifier requests $332_N$) and/or virtualized entity commands (e.g., virtualized entity commands $432_1$ and virtualized entity commands $432_N$) are received at each virtualized identifier manager. Such requests and/or commands are often issued independently (e.g., from different system administrators) across the clusters. In some cases, such independence can result in duplication of certain information across the clusters. For example, as shown in the example identifier mapping table data (e.g., identifier mapping table data $338_1$ and identifier mapping table data $338_N$) at each cluster, a duplicate identifier key 540 (e.g., "adminKey1") might be present. Specifically, since the identifier key is user-specified, two or more system administrators, for example, might specify the same identifier key when requesting VEIDs.

The duplicate identifier key notwithstanding, the herein disclosed techniques generate VEIDs that are unique across the clusters. Specifically, by deploying a low collision highly differentiable UUID generation algorithm such as the version 4 UUID algorithm, the UUIDs (e.g., VEIDs) associated with any given identifier key, even duplicate identifier keys, will be spatially and temporally unique. For example, the VEIDs (e.g., "id001", "id002", etc.) associated with "adminKey1" at cluster $250_1$ are different from the VEIDs associated with "adminKey1" at cluster $250_N$. Mapping and validating the VEIDs in each subsystem (e.g., cluster, site, datacenter, etc.) according to the herein disclosed techniques further avoids conflicts between VEIDs.

In some systems or environments, a centralized access point is implemented to manage multiple subsystems (e.g., clusters) from single interface. One approach to synchronizing VEIDs managed according to the herein disclosed techniques for centralized access is shown and described as pertaining to FIG. 6.

Figure 6:
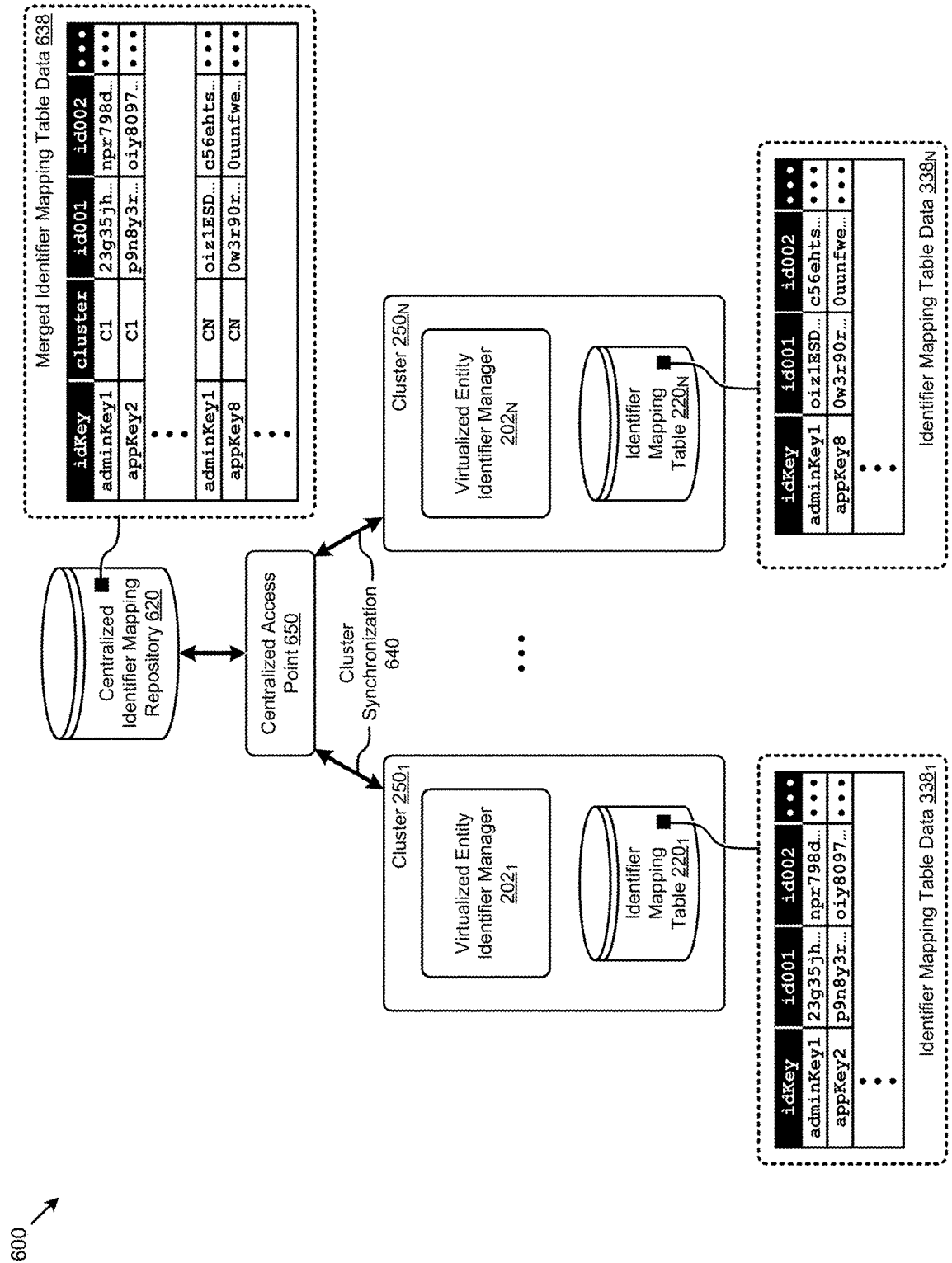
FIG. 6 depicts a centralized entity identifier synchronization technique as implemented in systems for forming and maintaining system generated unique entity identifiers in hyperconverged distributed environments, according to an embodiment.

FIG. 6 depicts a centralized entity identifier synchronization technique 600 as implemented in systems for forming and maintaining system generated unique entity identifiers in hyperconverged distributed environments. As an option, one or more variations of centralized entity identifier synchronization technique 600 or any aspect thereof may be implemented in the context of the architecture and functionality of the embodiments described herein. The centralized entity identifier synchronization technique 600 or any aspect thereof may be implemented in any environment.

FIG. 6 depicts the components associated with the multi-cluster environment earlier shown and described as pertaining to FIG. 5. Specifically, instances of a virtualized entity manager (e.g., virtualized entity identifier manager $202_1$ and virtualized entity identifier manager $202_N$), and an identifier mapping table (e.g., identifier mapping table $220_1$ and identifier mapping table $220_N$) with respective identifier mapping table data examples (e.g., identifier mapping table data $338_1$ and identifier mapping table data $338_N$) for two representative clusters (e.g., cluster $250_1$ and cluster $250_N$) are depicted. A centralized access point 650 having an associated instance of a centralized identifier mapping repository 620 is also shown. As used herein, a centralized access point is a set of resources selected to facilitate various inter-cluster management operations. For example, centralized access point 650 might comprise a user interface that a system administrator can interact with to manage certain aspects (e.g., topology, operation, performance, etc.) of the multi-cluster hyperconverged distributed system. More specifically, the system administrator might use the centralized access point 650 to manage the allocation, scheduling, and performance of the virtualized entities (VEs) across the clusters. Conflicts pertaining to the VEIDs used to reference these such VEs can reduce the efficacy and accuracy of a centralized multi-cluster VE management approach.

The herein disclosed techniques address the potential for VEIDs conflicts as shown in the centralized entity identifier synchronization technique 600. As shown, when a cluster synchronization 640 is performed at the centralized access point 650, a merged identifier mapping table is generated and stored in the centralized identifier mapping repository 620. As depicted in the merged identifier mapping table data 638 according to the shown embodiment, the data from each of the cluster-specific instances of the identifier mapping table is aggregated in a database table with an additional "cluster" column. The purpose of the "cluster" column is to indicate the subsystem (e.g., cluster, site, datacenter, etc.) associated with the particular identifier mapping data. For example, the portion of the data in merged identifier mapping table data 638 from the identifier mapping table data $338_1$ comprises a "C1" identifier in the "cluster" column to indicate the data source is cluster $250_1$. Further, the portion of the data in merged identifier mapping table data 638 from the identifier mapping table data $338_N$ comprises a "CN" identifier in the "cluster" column to indicate the data source is cluster $250_N$. The centralized access point 650 can use the information in the "cluster" column as a qualifier for addressing specific VEs having associated information (e.g., identifier keys) that might be duplicates. For example, centralized access point 650 might use extended identifier keys of "adminKey1.C1" and "adminKey1.CN" to differentiate between identifier key "adminKey1" from cluster $250_1$ and identifier key "adminKey1" from cluster $250_N$, respectively. Other embodiments and techniques for synchronizing, merging, and tracking the VEIDs from multiple resource subsystems are possible.

Figure 7:
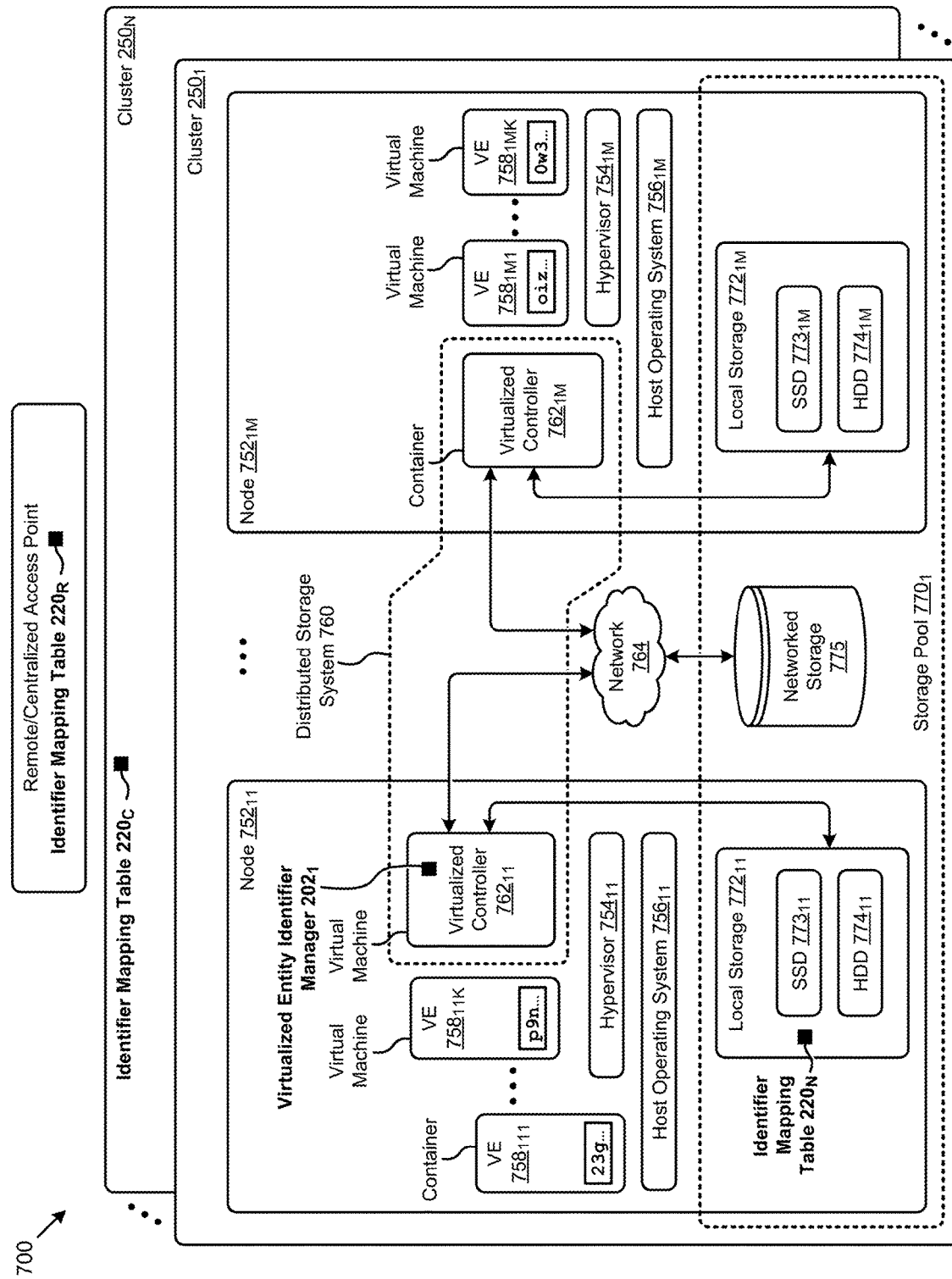
FIG. 7 depicts a multi-cluster distributed environment in which embodiments of the present disclosure can operate.

One embodiment of an environment for implementing any of the herein disclosed techniques is shown and described as pertaining to FIG. 7.

FIG. 7 depicts a multi-cluster distributed environment 700 in which embodiments of the present disclosure can operate. As an option, one or more variations of multi-cluster distributed environment 700 or any aspect thereof may be implemented in the context of the architecture and functionality of the embodiments described herein. The multi-cluster distributed environment 700 or any aspect thereof may be implemented in any environment.

The distributed virtualization environment shown in FIG. 7 depicts various components associated with one instance of a distributed virtualization system (e.g., hyperconverged distributed system) comprising a distributed storage system 760 that can be used to implement the herein disclosed techniques. Specifically, the multi-cluster distributed environment 700 comprises multiple clusters (e.g., cluster $250_1, \ldots,$ cluster $250_N$) comprising multiple nodes that have multiple tiers of storage in a storage pool. Representative nodes (e.g., node $752_{11}, \ldots,$ node $752_{1M}$) and storage pool $770_1$ associated with cluster $250_1$ are shown. Each node can be associated with one server, multiple servers, or portions of a server. The nodes can be associated (e.g., logically and/or physically) with the clusters. As shown, the multiple tiers of storage include storage that is accessible through a network 764, such as a networked storage 775 (e.g., a storage area network or SAN, network attached storage or NAS, etc.). The multiple tiers of storage further include instances of local storage (e.g., local storage $772_{11}$, ..., local storage $772_{1M}$). For example, the local storage can be within or directly attached to a server and/or appliance associated with the nodes. Such local storage can include solid state drives (SSD $773_{11}$, ..., SSD $773_{1M}$), hard disk drives (HDD $774_{11}$, ..., HDD $774_{1M}$), and/or other storage devices.

As shown, the nodes in multi-cluster distributed environment 700 can implement one or more user virtualized entities (e.g., VE $758_{111}$, ..., VE $758_{11K}$, ..., VE $758_{1M1}$, ..., VE $758_{1MK}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $756_{11}$, ..., host operating system $756_{1M}$), while the VMs run multiple applications on various respective guest operating systems. Such flexibility can be facilitated at least in part by a hypervisor (e.g., hypervisor $754_{11}$, ..., hypervisor $754_{1M}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $756_{11}$, ..., host operating system $756_{1M}$) with, in most cases, no hypervisor layer. This lightweight implementation can facilitate efficient distribution of certain software components, such as applications or services (e.g., micro-services). As shown, multi-cluster distributed environment 700 can implement both a hypervisor-assisted virtualization environment and a container virtualization environment for various purposes.

Multi-cluster distributed environment 700 also comprises at least one instance of a virtualized controller to facilitate access to storage pool $770_1$ by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a hypervisor).

Multiple instances of such virtualized controllers can coordinate within a cluster to form the distributed storage system 760 which can, among other operations, manage the storage pool $770_1$. This architecture further facilitates efficient scaling of the distributed virtualization system. The foregoing virtualized controllers can be implemented in multi-cluster distributed environment 700 using various techniques. Specifically, an instance of a virtual machine at a given node can be used as a virtualized controller in a hypervisor-assisted virtualization environment to manage storage and I/O activities. In this case, for example, the virtualize entities at node $752_{11}$ can interface with a controller virtual machine (e.g., virtualized controller $762_{11}$) through hypervisor $754_{11}$ to access the storage pool $770_1$. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 760.

For example, a hypervisor at one node in the distributed storage system 760 might correspond to VMware ESXi software, and a hypervisor at another node in the distributed storage system 760 might correspond to Nutanix AHV software. As another virtualized controller implementation example, containers (e.g., Docker containers) can be used to implement a virtualized controller (e.g., virtualized controller $762_{1M}$) in an operating system virtualization environment at a given node. In this case, for example, the virtualized entities at node $752_{1M}$ can access the storage pool $770_1$ by interfacing with a controller container (e.g., virtualized controller $762_{1M}$) through hypervisor $754_{1M}$ and/or the kernel of host operating system $756_{1M}$.

In certain embodiments, one or more instances of a virtualized entity identifier manager can be implemented in the distributed storage system 760 to facilitate the herein disclosed techniques. Specifically, virtualized entity identifier manager $202_1$ can be implemented in the virtualized controller $762_{11}$. As an example, virtualized controller $762_{11}$ at node $752_{11}$ might be selected (e.g., elected leader) to host the virtualized entity identifier manager $202_1$ to facilitate forming and maintaining system generated unique virtualized entity identifiers pertaining to cluster $250_1$ in multi-cluster distributed environment 700. Such instances of the virtualized entity identifier manager can be implemented in any node in any cluster and can manage the virtualized entity identifiers associated with the cluster, a portion of the cluster, or multiple clusters. For example, other instances of the virtualized entity identifier manager can be implemented in other clusters or resource subsystems in multi-cluster distributed environment 700 to manage the VEIDs pertaining to those respective subsystems. In some cases, a virtualized controller in the multi-cluster distributed environment 700 is selected to serve as a centralized access point for managing the VEIDs from multiple resource subsystems (e.g., clusters). As shown, the local storage facilities at a particular node can store an instance of the identifier mapping table $220_N$ for use by the virtualized entity identifier manager $202_1$. In some embodiments, a different cluster can store an instance of the identifier mapping table $220_c$ for use by any virtualized entity identifier managers in the computing environment. In some embodiments, a remote access point or centralized access point can store an instance of the identifier mapping table $220_R$.

ADDITIONAL EMBODIMENTS OF THE DISCLOSURE

Additional Practical Application Examples

Figure 8:
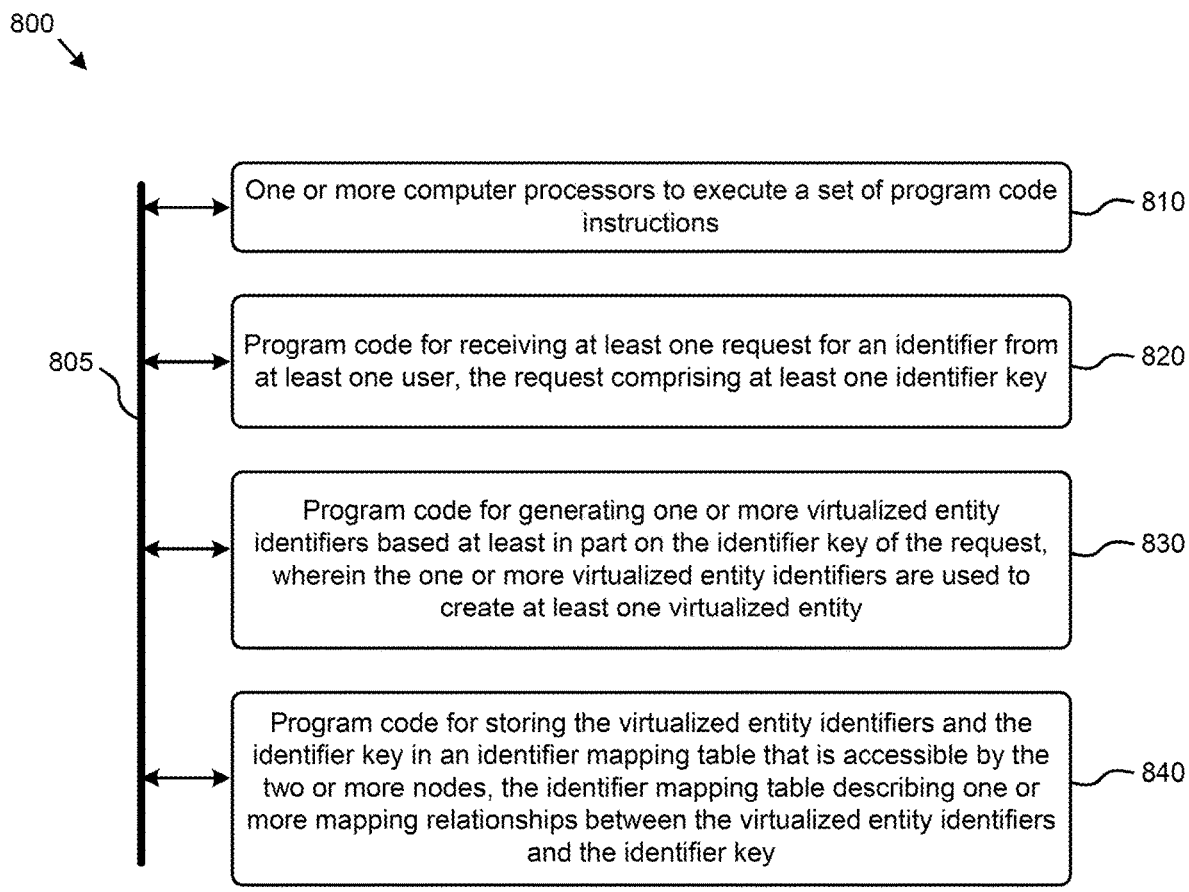
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. This and other embodiments present particular arrangements of elements that individually, and/or as combined, serve to form improved technological processes that avoid virtualized entity identifier conflicts in a hyperconverged distributed system. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment. The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims. The shown embodiment implements a portion of a computer system, presented as system 800, comprising a computer processor to execute a set of program code instructions (module 810) and modules for accessing memory to hold program code instructions to perform: receiving at least one request for an identifier from at least one user, the request comprising at least one identifier key (module 820); generating one or more virtualized entity identifiers based at least in part on the identifier key of the request, wherein the one or more virtualized entity identifiers are used to create at least one virtualized entity (module 830); and storing the virtualized entity identifiers and the identifier key in an identifier mapping table that is accessible by the two or more nodes, the identifier mapping table describing one or more mapping relationships between the virtualized entity identifiers and the identifier key (module 840).

Figure 9A:
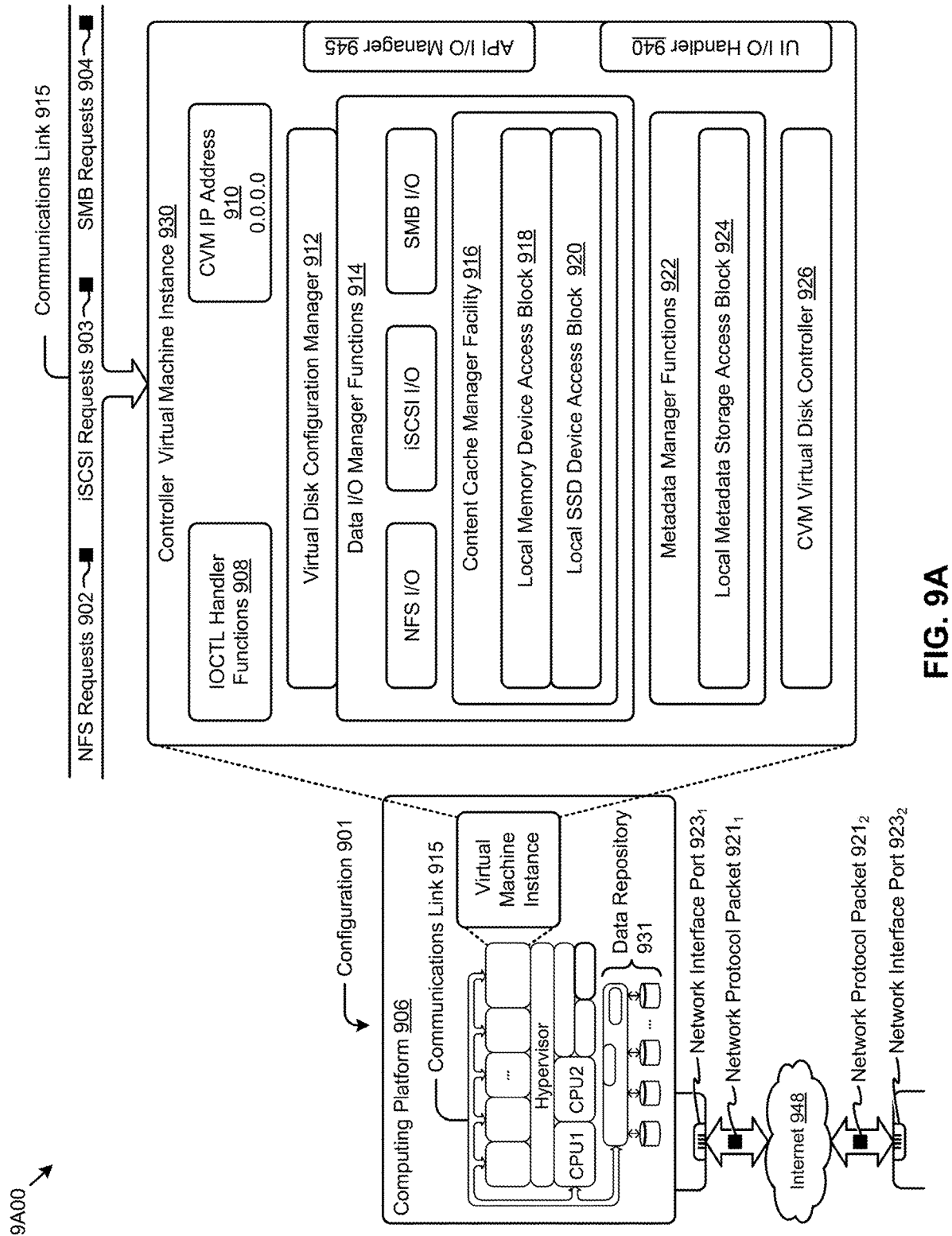
FIG. 9A and FIG. 9B depict virtualized controller architectures comprising collections of interconnected components suitable for implementing embodiments of the present disclosure and/or for use in the herein-described environments.

Variations of the foregoing may include more or fewer of the shown modules. Certain variations may perform more or fewer (or different) steps, and/or certain variations may use data elements in more, or in fewer (or different) operations.
System Architecture Overview
Additional System Architecture Examples FIG. 9A depicts a virtualized controller as implemented by the shown virtual machine architecture 9A00. The heretofore-disclosed embodiments including variations of any virtualized controllers can be implemented in distributed systems where a plurality of networked-connected devices communicate and coordinate actions using inter-component messaging. Distributed systems are systems of interconnected components that are designed for or dedicated to storage operations as well as being designed for, or dedicated to, computing and/or networking operations. Interconnected components in a distributed system can operate cooperatively so as to serve a particular objective, such as to provide high-performance computing, high-performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates efficient use of compute and storage resources by and between the components of the distributed system. Adding a hyperconverged unit to a hyperconverged system expands the system in multiple dimensions. As an example, adding a hyperconverged unit to a hyperconverged system can expand in the dimension of storage capacity while concurrently expanding in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as containers. In some systems and/or environments, hypervisor-assisted virtualization techniques and operating system virtualization techniques are combined.

As shown, the virtual machine architecture 9A00 comprises a collection of interconnected components suitable for implementing embodiments of the present disclosure and/or for use in the herein-described environments. Moreover, the shown virtual machine architecture 9A00 includes a virtual machine instance in a configuration 901 that is further described as pertaining to the controller virtual machine instance 930. A controller virtual machine instance receives block I/O (input/output or IO) storage requests as network file system (NFS) requests in the form of NFS requests 902, and/or internet small computer storage interface (iSCSI) block IO requests in the form of iSCSI requests 903, and/or Samba file system (SMB) requests in the form of SMB requests 904. The controller virtual machine (CVM) instance publishes and responds to an internet protocol (IP) address (e.g., CVM IP address 910). Various forms of input and output (I/O or IO) can be handled by one or more IO control handler functions (e.g., IOCTL functions 908) that interface to other functions such as data IO manager functions 914 and/or metadata manager functions 922. As shown, the data IO manager functions can include communication with a virtual disk configuration manager 912 and/or can include direct or indirect communication with any of various block IO functions (e.g., NFS IO, iSCSI IO, SMB TO, etc.).

In addition to block IO functions, the configuration 901 supports IO of any form (e.g., block IO, streaming IO, packet-based IO, HTTP traffic, etc.) through either or both of a user interface (UI) handler such as UI IO handler 940 and/or through any of a range of application programming interfaces (APIs), possibly through the shown API IO manager 945.

The communications link 915 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 930 includes a content cache manager facility 916 that accesses storage locations, possibly including local dynamic random access memory (DRAM) (e.g., through the local memory device access block 918) and/or possibly including accesses to local solid state storage (e.g., through local SSD device access block 920).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 931, which in turn can be formatted into any one or more storage areas, and which can comprise parameterized storage accessible by a key (e.g., a filename, a table name, a block address, an offset address, etc.). An external data repository 931 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 924. The external data repository 931 can be configured using a CVM virtual disk controller 926, which can in turn manage any number or any configuration of virtual disks.

Execution of the sequences of instructions to practice certain embodiments of the disclosure are performed by a one or more instances of a software instruction processor, or a processing element such as a data processor, or such as a central processing unit (e.g., CPU1, CPU2). According to certain embodiments of the disclosure, two or more instances of a configuration 901 can be coupled by a communications link 915 (e.g., backplane, LAN, PTSN, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port $923_1$ and network interface port $923_2$). The configuration 901 can be addressed through one or more network interface ports using an IP address. Any operational element within computing platform 906 can perform sending and receiving operations using any of a range of network protocols, possibly including network protocols that send and receive packets (e.g., network protocol packet $921_1$ and network protocol packet $921_2$).

The computing platform 906 may transmit and receive messages that can be composed of configuration data, and/or any other forms of data and/or instructions organized into a data structure (e.g., communications packets). In some cases, the data structure includes program code instructions (e.g., application code) communicated through Internet 948 and/or through any one or more instances of communications link 915. Received program code may be processed and/or executed by a CPU as it is received and/or program code may be stored in any volatile or non-volatile storage for later execution. Program code can be transmitted via an upload (e.g., an upload from an access device over the Internet 948 to computing platform 906). Further, program code and/or results of executing program code can be delivered to a particular user via a download (e.g., a download from the computing platform 906 over the Internet 948 to an access device).

The configuration 901 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A cluster is often embodied as a collection of computing nodes that can communicate between each other through a local area network (e.g., LAN or VLAN) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or chassis or rack that hosts a finite number of mounted-in computing units. A computing unit in a rack can take on a role as a server, or as a storage unit, or as a networking unit, or any combination therefrom. In some cases, a unit in a rack is dedicated to provision of power to the other units. In some cases, a unit in a rack is dedicated to environmental conditioning functions such as filtering and movement of air through the rack, and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to implement algorithms that facilitate operational and/or performance characteristics pertaining to forming and maintaining system generated unique entity identifiers in hyperconverged distributed environments. In some embodiments, a module may include one or more state machines and/or combinational logic used to implement or facilitate the operational and/or performance characteristics pertaining to forming and maintaining system generated unique entity identifiers in hyperconverged distributed environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of forming and maintaining system generated unique entity identifiers in hyperconverged distributed environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to forming and maintaining system generated unique entity identifiers in hyperconverged distributed environments, and/or for improving the way data is manipulated when performing computerized operations pertaining to generating unique virtualized entity identifiers associated with a user-specified key to facilitate conflict-free entity identification in hyperconverged distributed systems.

Further details regarding general approaches to managing data repositories are described in U.S. Pat. No. 8,601,473 titled, "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled, "METHOD AND SYSTEM FOR IMPLEMENTING MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 9B:
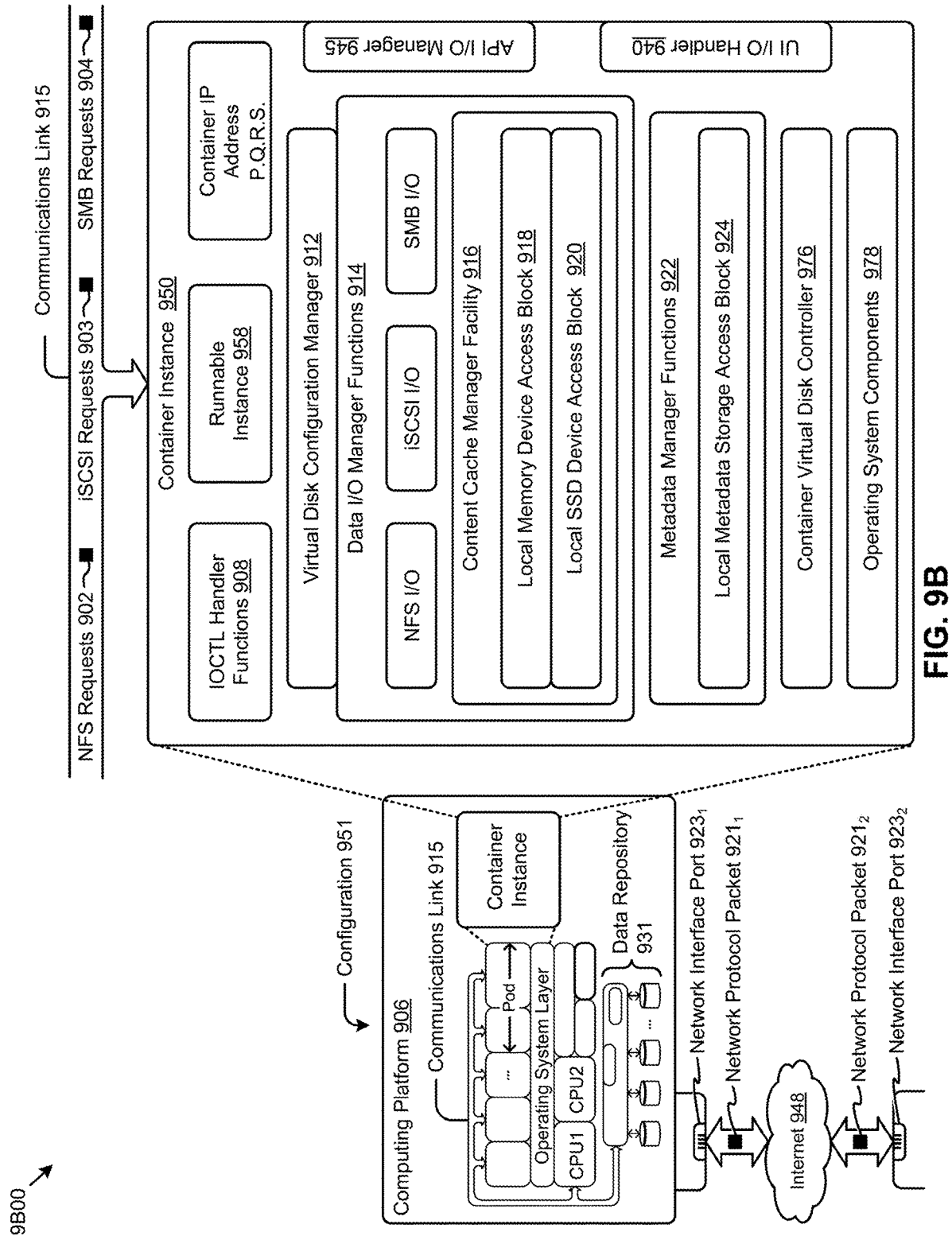

FIG. 9B depicts a virtualized controller implemented by a containerized architecture 9B00. The containerized architecture comprises a collection of interconnected components suitable for implementing embodiments of the present disclosure and/or for use in the herein-described environments. Moreover, the shown containerized architecture 9B00 includes a container instance in a configuration 951 that is further described as pertaining to the container instance 950. The configuration 951 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 950). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls-a", etc.). The container might optionally include operating system components 978, however such a separate set of operating system components need not be provided. As an alternative, a container can include a runnable instance 958, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 976. Such a container virtual disk controller can perform any of the functions that the aforementioned CVM virtual disk controller 926 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method in a virtualized environment comprising multiple virtualized entities in multiple namespaces, each virtualized entity of the multiple entities identified by an identifier key, the method comprising:
    receiving a request for uniquely identifying, from amongst multiple virtualized entities in multiple namespaces, a virtualized entity for avoiding a conflict in referencing the multiple virtual entities within a virtualization environment, wherein
    the conflict that is avoided corresponds to a plurality of requests that refer to different virtualized entities with an identifier key;
    generating a unique identifier that uniquely identifies the virtualized entity from the multiple virtualized entities in the multiple namespaces to satisfy the request, wherein
        the request refers to the virtualized entity as the identifier key, and
        the unique identifier is used to create the virtualized entity in the virtualization environment; and
    storing a relationship between the virtualized entity, the identifier key, and the unique identifier in a data structure accessible by the virtualization environment.

2. The method of claim 1, further comprising, migrating the virtualized entity from a first one node to a second node in the virtualization environment.

3. The method of claim 1, further comprising:
    receiving a command comprising the unique identifier for the virtualized entity; and
    validating the unique identifier for the virtualized entity.

4. The method of claim 3, wherein validating the unique identifier for the virtualized entity comprises searching the data structure to discover the unique identifier for the virtualized entity.

5. The method of claim 1, wherein the request further comprises a count value.

6. The method of claim 5, wherein the count value corresponds to at least one of a number of requested virtualized entity identifiers, or a total number of virtualized entity identifiers associated with the unique identifier key.

7. The method of claim 1, wherein the data structure is associated with a resource subsystem in the virtualization environment.

8. The method of claim 7, wherein the resource subsystem is at least one of a cluster, a site, or a datacenter.

9. The method of claim 1, further comprising merging a first data structure from a first resource subsystem in the virtualization environment with a second data structure from a second resource subsystem in the virtualization environment.

10. The method of claim 1, wherein generating the unique identifier for the virtualized entity is performed by a version 4 UUID (universally unique identifier) algorithm.

11. The method of claim 1, wherein the request is structured according to an API (application programing interface).

12. A non-transitory computer readable medium having stored thereon a sequence of instructions which, when stored in memory and executed by a processor, causes the processor to perform a set of acts for a virtualized environment comprising multiple virtualized entities in multiple namespaces, each virtualized entity of the multiple entities identified by an identifier key, the set of acts comprising:
    receiving a request for uniquely identifying, from amongst multiple virtualized entities in multiple namespaces, a virtualized entity for avoiding a conflict in referencing the multiple virtual entities within a virtualization environment, wherein
    the conflict that is avoided corresponds to a plurality of requests that refer to different virtualized entities with an identifier key;
    generating unique identifier that uniquely identifies the virtualized entity from the multiple virtualized entities in the multiple namespaces to satisfy the request, wherein
        the request refers to the virtualized entity as the identifier key, and
        the unique identifier is used to create the virtualized entity in the virtualization environment; and
    storing a relationship between the virtualized entity, the identifier key, and the unique identifier in a data structure accessible by the virtualization environment.

13. The non-transitory computer readable medium of claim 12, further comprising instructions which, when stored in the memory and executed by the processor, causes the processor to perform acts of, migrating the virtualized entity from a first node to a second node in the virtualization environment.

14. The non-transitory computer readable medium of claim 12, further comprising instructions which, when stored in the memory and executed by the processor, causes the processor to perform acts of:
    receiving a command comprising the unique identifier for the virtualized entity; and
    validating the unique identifier for the virtualized entity.

15. The non-transitory computer readable medium of claim 14, wherein validating the unique identifier for the virtualized entity comprises searching the data structure to discover the unique identifier for the virtualized entity in the data structure.

16. The non-transitory computer readable medium of claim 12, wherein the request further comprises a count value.

17. The non-transitory computer readable medium of claim 16, wherein the count value corresponds to at least one of a number of requested virtualized entity identifiers, or a total number of virtualized entity identifiers associated with the unique identifier key.

18. The non-transitory computer readable medium of claim 12, wherein the data structure is associated with a resource subsystem in the virtualization environment.

19. A system in a virtualized environment comprising multiple virtualized entities in multiple namespaces, each virtualized entity of the multiple entities identified by an identifier key, comprising:
    a processor; and
    a storage medium having stored thereon a sequence of instructions which, when executed by the processor, causes the one or more processors to perform a set of acts, the set of acts comprising,
        receiving a request for uniquely identifying, from amongst multiple virtualized entities in multiple namespaces, a virtualized entity for avoiding a conflict in referencing the multiple virtual entities within a virtualization environment, wherein
        the conflict that is avoided corresponds to a plurality of requests that refer to different virtualized entities with an identifier key;

generating a unique identifier that uniquely identifies the virtualized entity from the multiple virtualized entities in the multiple namespaces to satisfy the request, wherein
- the request refers to the virtualized entity as the identifier key, and
- the unique identifier is used to create the virtualized entity in the virtualization environment; and storing a relationship between the virtualized entity, the identifier key, and the unique identifier in a data structure accessible by the virtualization environment.

20. The system of claim 19, wherein the data structure is associated with a resource subsystem in the virtualization environment, and the resource subsystem is at least one of a cluster, a site, or a datacenter.

\* \* \* \* \*